(12) United States Patent
Nistor et al.

(10) Patent No.: US 10,097,442 B2
(45) Date of Patent: Oct. 9, 2018

(54) METHODS, SYSTEMS, AND COMPUTER READABLE MEDIA FOR RECEIVING TEST CONFIGURATION INFORMATION

(71) Applicant: Ixia, Calabasas, CA (US)

(72) Inventors: Marius Pavel Nistor, Bucharest (RO); Nicolas Ribault, Issy les Moulineaux (FR); Mihail Florin Constantinescu, Bucharest (RO); Taran Singh, Woodland Hills, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 893 days.

(21) Appl. No.: 14/557,418

(22) Filed: Dec. 1, 2014

(65) Prior Publication Data

US 2016/0156541 A1    Jun. 2, 2016

(30) Foreign Application Priority Data

Nov. 27, 2014  (RO) ............................... A009182014

(51) Int. Cl.
    *H04L 12/26* (2006.01)
    *H04L 12/24* (2006.01)
    *H04L 29/06* (2006.01)

(52) U.S. Cl.
    CPC .......... *H04L 43/50* (2013.01); *H04L 41/0806* (2013.01); *H04L 41/28* (2013.01); *H04L 43/10* (2013.01); *H04L 63/10* (2013.01)

(58) Field of Classification Search
    CPC ..... H04L 41/0806; H04L 41/28; H04L 43/10; H04L 43/50; H04L 63/10
    See application file for complete search history.

(56) References Cited

U.S. PATENT DOCUMENTS

| 6,381,218 B1 * | 4/2002 | McIntyre ............ G06F 11/3006 370/216 |
| 7,340,771 B2 | 3/2008 | Chan et al. |
| 7,594,259 B1 | 9/2009 | Audet et al. |

(Continued)

FOREIGN PATENT DOCUMENTS

| WO | WO 03/069493 A1 | 8/2003 |
| WO | WO 2016/130280 A1 | 8/2016 |
| WO | WO 2018/106304 | 6/2018 |

OTHER PUBLICATIONS

Notification of Transmittal of the International Search Report and the Written Opinion of the International Searching Authority, or the Declaration for International Application No. PCT/US2016/013827 (dated May 2, 2016).

(Continued)

*Primary Examiner* — Joe Chacko

(57) ABSTRACT

Methods, systems, and computer readable media for receiving test configuration information are disclosed. According to one exemplary method, the method occurs at a node configured to operate in a private network. The method includes registering node identification information with a registration server. The method also includes sending a keep-alive message to the registration server. The method further includes receiving, in response to the keep-alive message and via the registration server, test configuration information from a configuration system outside the private network.

19 Claims, 13 Drawing Sheets

(56) References Cited

U.S. PATENT DOCUMENTS

| | | | |
|---|---|---|---|
| 8,065,418 B1 | 11/2011 | Abuan et al. | |
| 9,052,941 B1* | 6/2015 | Bone | G06F 9/46 |
| 9,608,906 B2 | 3/2017 | Constantinescu et al. | |
| 9,680,877 B2* | 6/2017 | Duffield | H04L 63/20 |
| 9,769,291 B2 | 9/2017 | Nistor et al. | |
| 9,814,008 B2 | 11/2017 | Nistor | |
| 2002/0124189 A1 | 9/2002 | Bakke | |
| 2004/0125801 A1 | 7/2004 | Nawata | |
| 2004/0139227 A1 | 7/2004 | Takeda | |
| 2004/0240468 A1 | 12/2004 | Chin et al. | |
| 2004/0255156 A1 | 12/2004 | Chan et al. | |
| 2005/0076235 A1 | 4/2005 | Ormazabal et al. | |
| 2005/0226194 A1 | 10/2005 | Fan et al. | |
| 2006/0062203 A1 | 3/2006 | Satapati | |
| 2007/0083788 A1* | 4/2007 | Johnson | H04L 12/2697 714/1 |
| 2007/0213966 A1 | 9/2007 | Noble | |
| 2007/0283002 A1* | 12/2007 | Bornhoevd | G06F 9/54 709/224 |
| 2008/0072312 A1* | 3/2008 | Takeyoshi | H04L 12/4641 726/15 |
| 2008/0317020 A1 | 12/2008 | Horne | |
| 2009/0040942 A1 | 2/2009 | Yang | |
| 2009/0077245 A1 | 3/2009 | Smelyansky et al. | |
| 2009/0154363 A1 | 6/2009 | Stephens | |
| 2010/0183151 A1* | 7/2010 | Wing | H04L 63/029 380/257 |
| 2011/0010413 A1 | 1/2011 | Christenson et al. | |
| 2011/0187864 A1 | 8/2011 | Snider | |
| 2011/0289440 A1 | 11/2011 | Carter et al. | |
| 2012/0054491 A1 | 3/2012 | Tippett | |
| 2012/0075439 A1 | 3/2012 | Gong et al. | |
| 2012/0078547 A1 | 3/2012 | Murdoch | |
| 2013/0173962 A1 | 7/2013 | Li et al. | |
| 2013/0272322 A1 | 10/2013 | Sagarwala et al. | |
| 2014/0119203 A1* | 5/2014 | Sundaram | H04L 43/10 370/250 |
| 2014/0280901 A1* | 9/2014 | Balachandran | H04W 24/04 709/224 |
| 2014/0310397 A1 | 10/2014 | Tseng et al. | |
| 2015/0113588 A1 | 4/2015 | Wing et al. | |
| 2015/0242294 A1 | 8/2015 | Lapierre et al. | |
| 2016/0014011 A1 | 1/2016 | Liu et al. | |
| 2016/0173444 A1 | 6/2016 | Nistor | |
| 2016/0174178 A1 | 6/2016 | Nistor | |
| 2016/0234113 A1 | 8/2016 | Constantinescu et al. | |
| 2016/0234163 A1 | 8/2016 | Nistor et al. | |
| 2016/0248795 A1 | 8/2016 | Chien | |

OTHER PUBLICATIONS

Non-Final Office Action for U.S. Appl. No. 14/572,746 (dated Aug. 24, 2016).

Non-Final Office Action for U.S. Appl. No. 14/619,039 (dated Jul. 13, 2016).

Commonly-assigned, co-pending U.S. Appl. No. 14/619,039 for "Methods, Systems, and Computer Readable Media for Identifying Network Locations Associated with Endpoints," (Unpublished, filed Feb. 10, 2015).

Commonly-assigned, co-pending U.S. Appl. No. 14/619,041 for "Methods, Systems, and Computer Readable Media for Facilitating the Resolving of Endpoint Hostnames in Test Environments with Firewalls, Network Address Translators (NATs), or Clouds," (Unpublished, filed Feb. 14, 2015).

Commonly-assigned, co-pending U.S. Appl. No. 14/574,359 for "Methods, Systems, and Computer Readable Media for Initiating and Executing Performance Tests of a Private Network and/or Components Thereof," (Unpublished, filed Dec. 17, 2014).

Commonly-assigned, co-pending U.S. Appl. No. 14/572,746 for "Methods, Systems, and Computer Readable Media for Receiving a Clock Synchronization Message," (Unpublished, filed Dec. 16, 2014).

"UDP hole punching," Wikipedia, http://en.wikipedia.org/wiki/UDP_hole_punching, (Nov. 25, 2014).

Marius Pavel Nistor, "Application Mixes Add New Levels of Realism to IxChariot 8 Network Testing," Ixia, (Aug. 1, 2014).

Non-Final Office Action for U.S. Appl. No. 14/572,746 (dated Mar. 7, 2017).

Non-Final Office Action for U.S. Appl. No. 14/574,359 (dated Jan. 17, 2017).

Non-Final Office Action for U.S. Appl. No. 14/619,041 (dated Dec. 16, 2016).

Notice of Allowance and Fee(s) Due for U.S. Appl. No. 14/619,039 (dated Nov. 7, 2016).

Final Office Action for U.S. Appl. No. 14/574,359 (dated Jul. 27, 2017).

Notice of Allowance and Fee(s) Due for U.S. Appl. No. 14/572,746 (dated Jul. 11, 2017).

Applicant Initiated Interview Summary for U.S. Appl. No. 14/572,746 (dated Jun. 22, 2017).

Notice of Allowance and Fee(s) Due for U.S. Appl. No. 14/619,041 (dated May 9, 2017).

Non-Final Office Action for U.S. Appl. No. 14/574,359 (dated Nov. 16, 2017).

Advisory Action and AFCP 2.0 Decision for U.S. Appl. No. 14/574,359 (dated Oct. 16, 2017).

Supplemental Notice of Allowability for U.S. Appl. No. 14/572,746 (dated Oct. 5, 2017).

Notification of Transmittal of the International Search Report and the Written Opinion of the International Searching Authority, or the Declaration for International Application No. PCT/US2017/051357 (dated Dec. 15, 2017).

Notice of Allowance and Fee(s) Due and Examiner-Initiated Interview Summmry for U.S. Appl. No. 14/574,359 (dated Jun. 13, 2018).

Communication of European publication number and information on the application of Article 67(3) EPC for European Patent Application No. 16749568.8 (dated Aug. 23, 2017).

Extended European Search Report for European Application No. 16749568.8 (dated Jun. 8, 2018).

"NAT Port Mapping Protocol," Wikipedia, https://en.wikipedia.org/wiki/NAT_Port_Mapping_Protocol, pp. 1-2 (Accessed Mar. 22, 2018).

Vixie et al., "Dynamic Updates in the Domain Name System (DNS Update)," RFC 2136, pp. 1-26 (Apr. 1997).

\* cited by examiner

METHODS, SYSTEMS, AND COMPUTER READABLE MEDIA FOR RECEIVING TEST CONFIGURATION INFORMATION

PRIORITY CLAIM

This application claims the benefit of Romanian Patent Application No. A/00918/2014, filed Nov. 27, 2014; the disclosure of which is incorporated herein by reference in its entirety.

TECHNICAL FIELD

The subject matter described herein relates to test configuration. More specifically, the subject matter relates to methods, systems, and computer readable media for receiving test configuration information.

BACKGROUND

Network operators typically test network nodes for reliability and other characteristics before deploying the network nodes in live (e.g., non-test) and/or private networks. While testing a network node before deployment may be beneficial, scenarios exist where testing a network node in a live and/or private network is useful and/or necessary, e.g., for detecting and/or resolving previously undetected issues. However, issues can arise when attempting to configure network nodes for testing in a live and/or private network. In particular, configuring network nodes for testing in a live and/or private network may create or exacerbate security concerns since a test operator may need to traverse firewall and/or network address translation (NAT) devices to communicate with the network nodes.

Conventional solutions, such as secure shell (SSH) or hypertext transfer protocol (HTTP) tunneling, allow test configuration information to traverse firewall devices and NAT devices. However, these solutions are not completely secure because they require the test operator to open ports in the firewall devices (e.g., port '80' for HTTP and port '22' for SSH tunnels). These solutions also require significant product support work because each route which the test configuration information will traverse needs a tunnel. Moreover, HTTP encapsulation is also not preferred because although the operator may allow port '80' to be opened in the firewall devices, content-aware devices can block the traffic. Furthermore, manual setup of public IP endpoints is typically be needed for NAT traversal. Hence, a significant amount of work is generally required for configuring network nodes for testing in a live and/or private network.

Accordingly, a need exists for improved methods, systems, and computer readable media for receiving test configuration information.

SUMMARY

Methods, systems, and computer readable media for receiving test configuration information are disclosed. According to one exemplary method, the method occurs at a node configured to operate in a private network. The method includes registering node identification information at a registration server. The method also includes sending a keep-alive message to the registration server. The method further includes receiving, in response to the keep-alive message and via the registration server, test configuration information from a configuration system outside the private network.

According to one exemplary system, the system includes a node configured to operate in a private network. The node comprises a test configuration module (TCM) configured to register node identification information with a registration server, to send a keep-alive message to the registration server, and to receive, in response to the keep-alive message and via the registration server, test configuration information from a configuration system outside the private network.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors, network interfaces, and memory.

As used herein, each of the terms "function" and "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for receiving test configuration information. When preparing to test network nodes, test operators typically need to provide test configuration information to one or more nodes. For example, test configuration information may include any information usable for generating test traffic, informing and setting up test participants, and/or executing a test session that conforms to test requirements, e.g., as determined by a test operator. Currently, for test configuration information to traverse a firewall device, a setup port on which the endpoint listens on, must be opened in the firewall device. Also, if network address translation (NAT) is enabled, a manual mapping must be done between public and private IPs of endpoints.

In accordance with some aspects of the subject matter described herein, techniques for communicating test configuration information may include using various mechanisms (e.g., endpoints registration, inversed connections, proxy endpoints, registration servers, and/or keep-alive messages) so that the test configuration information can traverse security related devices (e.g., a firewall device and/or a network address translation (NAT) device) to reach endpoints (e.g., traffic generators). For example, a registration server may be utilized to provide test configuration information (e.g., address information and/or port information about an out-of-network configuration system) without opening ports in the firewall device and/or without mapping address information (e.g., Internet protocol (IP) addresses) if NAT is enabled.

Advantageously, in accordance with some aspects of the subject matter described herein, by communicating test configuration information without opening ports in a firewall device and/or without mapping address information if NAT is enabled, test configuration information may be provided to and received by network nodes in a live and/or private network, while minimizing or eliminating modifications to security related devices in the network.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
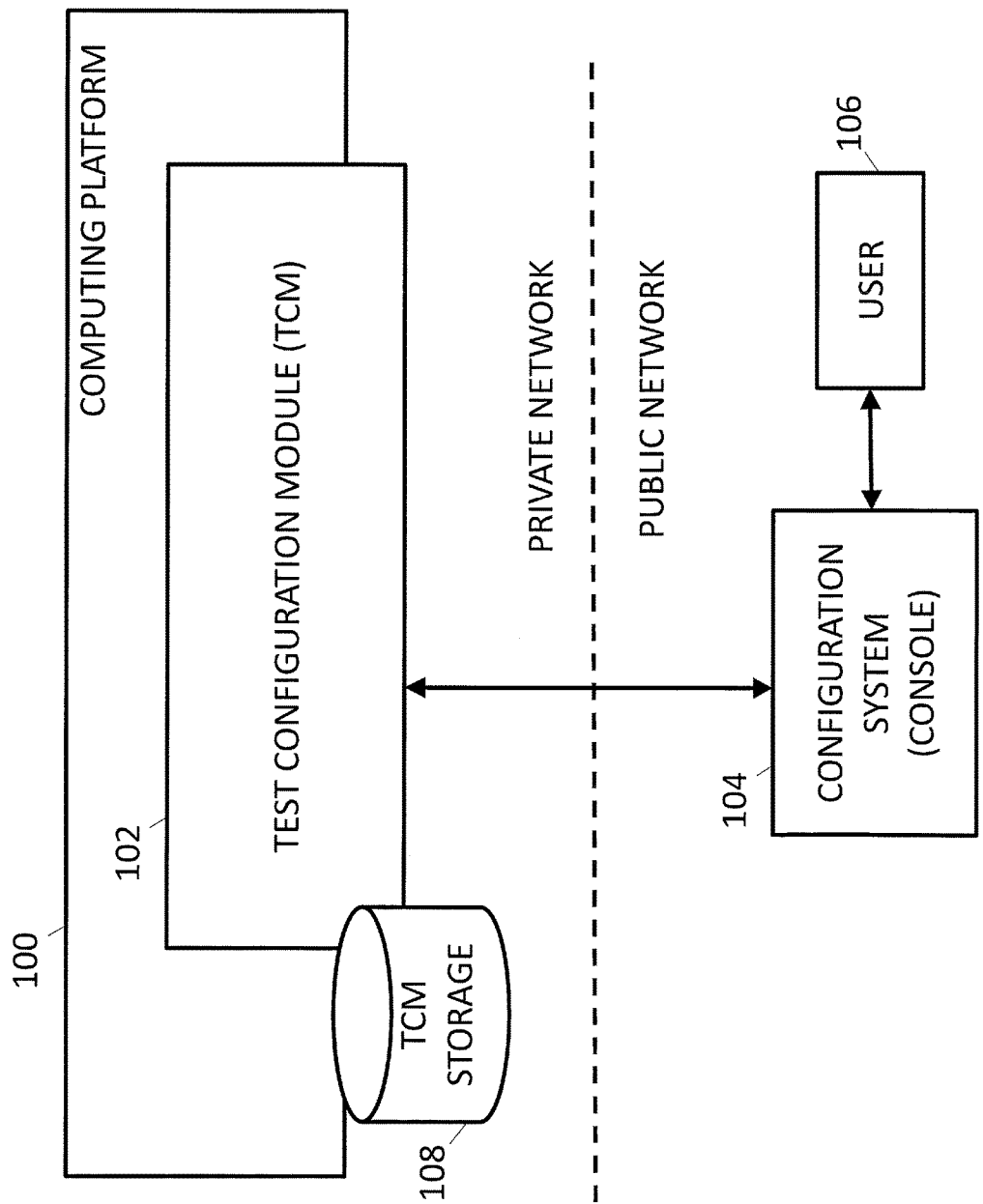
FIG. 1 is a diagram illustrating an exemplary computing platform for receiving test configuration information according to an embodiment of the subject matter described herein.

FIG. 1 is a diagram illustrating an exemplary computing platform 100 for receiving test configuration information according to an embodiment of the subject matter described herein. Referring to FIG. 1, a private network may include a computing platform 100 and a public network may include a configuration system 104.

Computing platform 100 may represent a network device, a network module, a node, or a system of devices, nodes, and/or modules. For example, computing platform 100 may be an endpoint located behind one or more security related devices, such as a firewall device or a NAT device, in a private network (e.g., a test network or an enterprise network). In some embodiments, computing platform 100 may be a single node or may include functionality distributed across multiple computing platforms or nodes.

In some embodiments, computing platform 100 may include a traffic generator and may emulate one or more network nodes. For example, computing platform 100 may be configured to emulate a web server and/or a user device and may generate test traffic (e.g., messages and/or packets) associated with these nodes.

In some embodiments, computing platform 100 and/or modules therein may receive test configuration information usable to set up a test session and/or execute a test session. For example, test configuration information may include a list of test participants and a script for generating and sending particular traffic and/or flows to the test participants. In this example, after receiving the test configuration information, computing platform 100 may configure, generate, and/or execute test traffic based on the test configuration information.

Computing platform 100 may communicate (e.g., directly and/or indirectly) with configuration system 104. Configuration system 104 may represent a node or device that includes functionality for generating and/or for sending test configuration information. For example, configuration system 104 may provide a communications interface or console for communicating with user 106. In some embodiments, user 106 may be an automated system or may be controlled or controllable by a human user. User 106 may select and/or determine test configuration information for configuring computing platform 100 and/or may control (e.g., start, pause, and/or stop) testing using one or more test control commands via configuration system 104.

In some embodiments, configuration system 104 may include one or more ports and/or modules for configuring one or more tests. For example, configuration system 104 may be configured to send different test configuration information and to test different network nodes at concurrent times. In this example, communications from or to configuration system 104 may occur using different port addresses, e.g., depending on the associated test or network nodes.

In some embodiments, communications from or to configuration system 104 and/or other nodes (e.g., in a public network or in a network different from computing platform 100) may occur without modifying configurations associated with security related devices in a private and/or live network. For example, test configuration information from a configuration system 104 in a public network may be received by computing platform 100 in an enterprise network without opening ports in a firewall device and/or without NAT related mapping changes.

Computing platform 100 may include or access a test configuration module (TCM) 102. TCM 102 may represent any suitable entity or entities (e.g., a computing platform, software executing on a processor, a logic device, a complex programmable logic device (CPLD), a field-programmable gate array (FPGA), and/or an application specific integrated circuit (ASIC)) for performing one or more aspects associated with receiving, sending, and/or using test configuration information. For example, TCM 102 may receive test communication information and may use the test communication information for configuring computing platform 100 and/or modules therein for testing purposes.

In some embodiments, TCM 102 may include functionality for receiving test configuration information via configuration system 104 and/or another node. For example, computing platform and/or a module therein may be configured to register with a registration server and, after registering, to send periodic keep-alive messages (e.g., every 2 seconds) to the registration server. In this example, the registration server may receive test configuration information from configuration system 104 and provide the test configuration information in a keep-alive response message to computing platform 100 and/or TCM 102.

In some embodiments, computing platform and/or TCM 102 may include functionality for using test configuration information. For example, computing platform and/or TCM 102 may receive and use test configuration information for discovering or identifying configuration system 104, for initiating connections to configuration system 104, for configuring a test session, for receiving a start signal to initiate the test session, for executing the test session (e.g., generating, receiving, and/or sending traffic), for receiving a stop signal to initiate stopping the test session, for stopping or completing the test session, and/or for reporting test results to one or more nodes.

In some embodiments, TCM 102 may include one or more communications interfaces for interacting with users, systems, and/or nodes. For example, TCM 102 may include one or more communications interfaces for receiving and sending various types of messages; such as IP messages, IP version 4 (v4) messages, IP version 6 (v6) messages, transmission control protocol (TCP) messages, stream control transmission protocol (SCTP) messages, real-time transport protocol (RTP) messages, or reliable data protocol (RDP) messages, general packet radio service (GPRS) tunneling protocol (GTP) messages, messages using another tunneling protocol, and/or other messages.

TCM storage 108 may represent any suitable entity (e.g., a non-transitory computer readable medium or a memory device) for storing data associated with message flows, messages, test traffic, test results, statistics, and/or test related information. Exemplary data stored at TCM storage 108 may include connection related information, traffic related information, test related information, address information, port information, proxy information, node identification information, test configuration information, test results, statistics, and/or other information.

In some embodiments, TCM storage 108 may be integrated with or accessible by TCM 102, computing platform 100, or modules therein. In some embodiments, TCM storage 108 may be located at a node distinct from TCM 102 and/or computing platform 100. For example, TCM storage 108 may be associated with a storage device separate from computing platform 100.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity.

Figure 2:
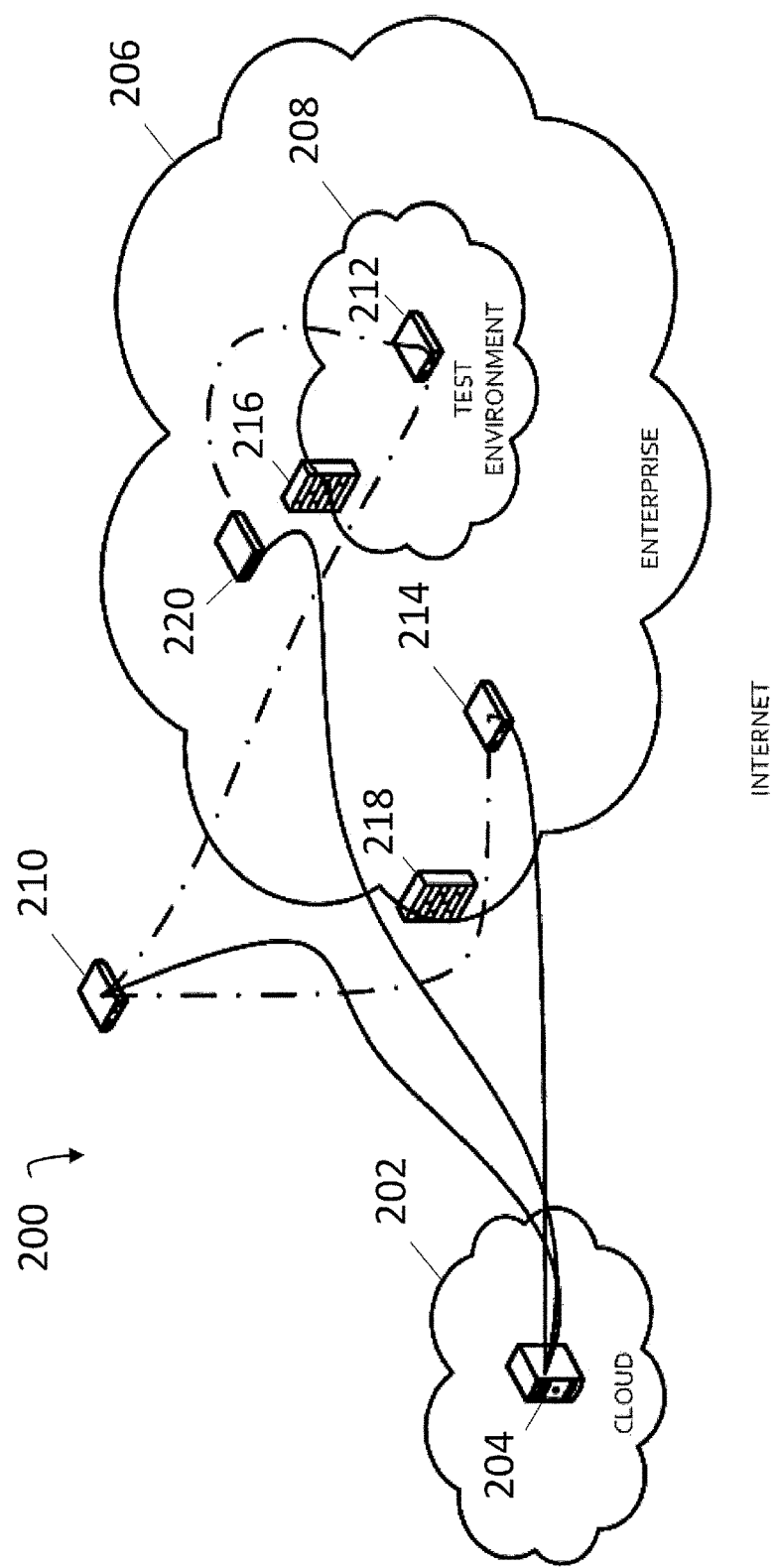
FIG. 2 is a diagram illustrating an exemplary environment for receiving test configuration information according to an embodiment of the subject matter described herein.

FIG. 2 is a diagram illustrating an exemplary environment 200 for receiving test configuration information according to an embodiment of the subject matter described herein. Referring to FIG. 2, exemplary environment 200 may include a cloud network 202 and an endpoint 210 connected to an enterprise or private network 206 via the Internet or other public network.

Endpoint 210 may represent a node (e.g., computing platform 100) including TCM 102 and/or similar functionality for receiving test configuration information and for generating test traffic using the test configuration information. In some embodiments, endpoint 210 may be located in a network different from nodes in cloud network 202 and/or private network 206. For example, endpoint 210 may be capable of communicating directly with cloud network 202 and nodes therein, but may require proxy nodes or may wait for inbound connections to be established with private network 206, e.g., since security related devices in private network 206 may block outbound connections from endpoint 210.

Cloud network 202 may include a console and a registration server (console/registration server) 204. Console/registration server 204 may represent one or more nodes that include functionality for registering nodes in enterprise network 206 and/or test environment 208 and/or for providing test configuration information to nodes, initiating a test, stopping a test, and/or interacting with one or more test operators.

Private network 206 may include an endpoint 214, a firewall device and/or a NAT device (firewall/NAT) 218, a proxy registration server 220, and/or a test environment 208. Endpoint 214 may represent a node (e.g., computing platform 100) including TCM 102 and/or similar functionality for receiving test configuration information and for generating test traffic using the test configuration information. In some embodiments, endpoint 214 may be capable of communicating directly with console/registration server 204, but may require proxy nodes or may wait for inbound connections to be established with test environment 208 or nodes therein, e.g., since security related devices in test environment 208 may block outbound connections from endpoint 214.

In some embodiments, communications to or from endpoint 214 may traverse firewall/NAT 218. Firewall/NAT 218 may represent any security related device, such as a firewall device and/or a NAT device, which may block, alter, and/or discard some communications. For example, firewall/NAT 218 may discard or block incoming connection requests from all nodes located in an outside network, e.g., connections requests from console/registration server 204 in cloud network 202.

Proxy registration server 220 may include functionality for communicating node identification information from one or more nodes to console/registration server 204. For example, proxy registration server 220 may be configured to receive registration messages from nodes in test environment 208 and, after receiving the information, may send the information to console/registration server 204.

Test environment 208 may represent one or more nodes associated with testing. For example, test environment 208 may represent a test lab that is outside of or insulated from a live enterprise network, e.g., private network 206. Test environment 208 may include a firewall/NAT 216 and an endpoint 212. Endpoint 212 may represent a node (e.g., computing platform 100) including TCM 102 and/or similar functionality for receiving test configuration information and for generating test traffic using the test configuration information. In some embodiments, communications to or from endpoint 216 may traverse firewall/NAT 216.

In some embodiments, private network 206 may include multiple levels of security. In such embodiments, test configuration information (e.g., test setup information) may be propagated from console/registration server 204 to various nodes involved in testing.

In some embodiments, connections may only be opened or initiated by nodes inside private network 206 since security related devices (e.g., firewall/NATs 218 and 218) may not allow inbound connections on ports, e.g., other than test ports. In such embodiments, endpoints in private network 206 and/or test environment 208 may only receive test configuration information from console/registration server 204 via outbound connections or using a proxy node or intermediate node.

In some embodiments, console/registration server 204 may utilize proxy nodes, such as a proxy registration server 220, to communicate with some nodes and/or networks. For example, console/registration server 204 may receive node identification information (e.g., registration information) from endpoint 212 via proxy registration server 220. In this example, a security related device, e.g., a firewall device and/or a NAT device (firewall/NAT) 216 may block inbound connection from console/registration server 204 to endpoint 212, but may allow outbound connections from or inbound connections to proxy registration server 220.

It will be appreciated that FIG. 2 is for illustrative purposes and that various nodes, their locations, and/or their functions described above in relation to FIG. 2 may be changed, altered, added, or removed. For example, some nodes and/or functions may be separated into a multiple entities.

Figure 3:
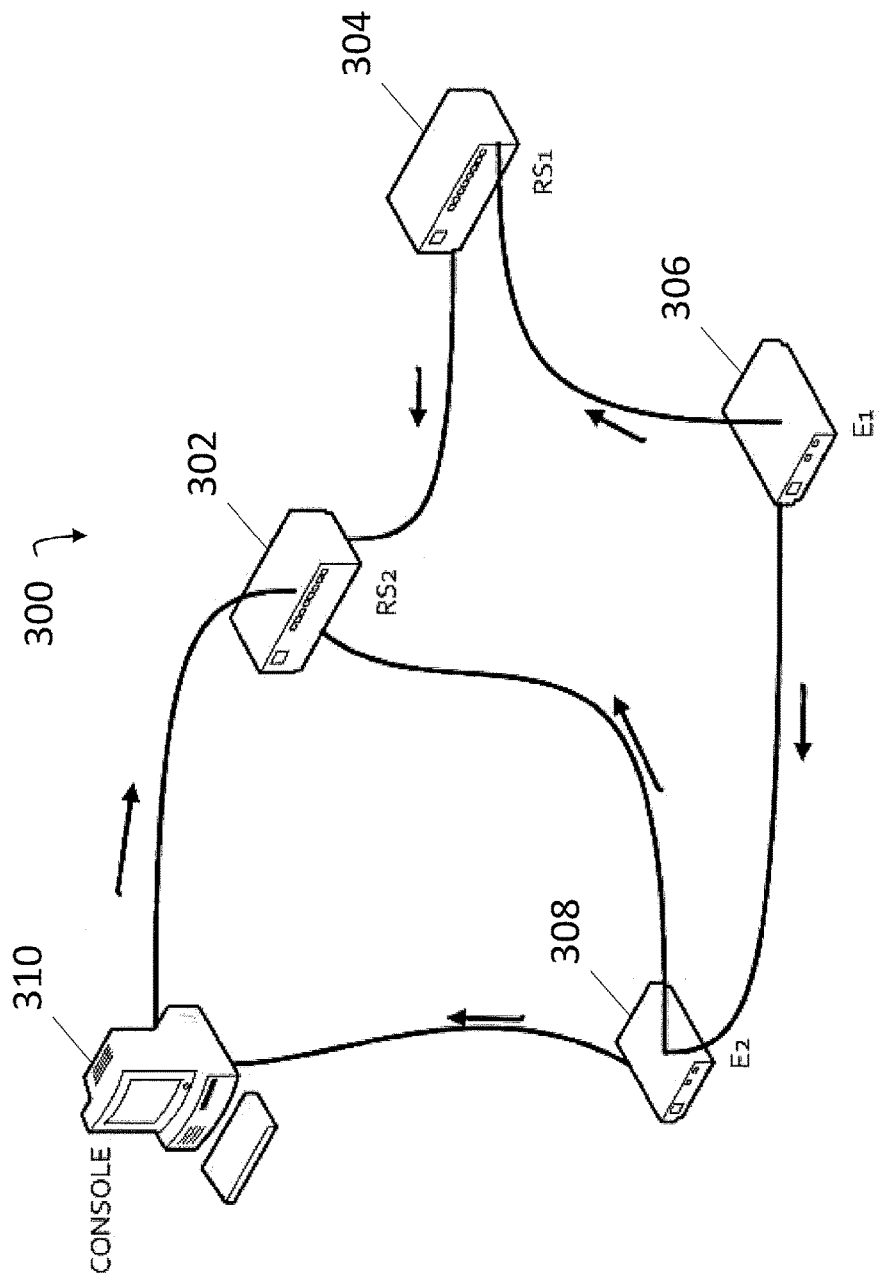
FIG. 3 is a diagram illustrating an exemplary test network according to an embodiment of the subject matter described herein.

FIG. 3 is a diagram illustrating an exemplary test network 300 according to an embodiment of the subject matter described herein. Referring to FIG. 3, test network 300 may include a registration server 302, a proxy registration server 304, an endpoint 306, a proxy endpoint 308, and a console 310.

Registration server 302 may represent a node capable of communicating (e.g., directly or indirectly) with proxy registration server 304, endpoint 306, proxy endpoint 308, and/or console 310. In some embodiments, registration server 302 may receive and store node identification information from various nodes. In some embodiments, registration server 304 may receive test configuration information from console 310 and may provide the test configuration information to one or more nodes. In some embodiments, registration server 302 may be located in a network different from one or more nodes.

In some embodiments, registration server 302 may register various nodes for test related purposes. In such embodiments, registration server 302 may also receive keep-alive messages from registered nodes for indicating current status and/or availability of the nodes and may respond with messages containing test configuration information and/or other information.

In some embodiments, registration server 302 may communicate with proxy registration server 304. Proxy registration server 304 may include functionality similar to registration server 220 and may be usable to communicate node identification information from one or more nodes to registration server 302. For example, endpoint 306 may be behind a firewall device and/or a NAT device that prevent direct communications with registration server 302, but may allow direct communications between endpoint 306 and proxy registration server 304. In this example, proxy registration server 304 may provide information received from endpoint 306 to registration server 302. In some embodiments, proxy registration server 304 may be located in a network different from registration server 302 and/or other nodes.

Endpoint 306 may represent a node (e.g., computing platform 100) including TCM 102 and/or similar functionality for receiving test configuration information and for generating test traffic using the test configuration information. In some embodiments, endpoint 306 may include functionality similar to endpoints 210-214. In some embodiments, endpoint 306 may be located in a network different from console 310, registration server 302 and/or other nodes.

In some embodiments, endpoint 306 may be configured to send keep-alive messages to registration server 302 and/or registration server 304 and to receive response message from registration server 302 and/or registration server 304. In some embodiments, endpoint 306 may initiate a test session and store test results and/or test related information.

In some embodiments, endpoint 306 may communicate with proxy endpoint 308. Proxy endpoint 308 may be usable to communicate test results and/or other test related information to console 310. For example, endpoint 306 may be behind a firewall device and/or a NAT device that prevent direct communications with console 310, but may allow direct communications between endpoint 306 and proxy endpoint 308. In some embodiments, proxy endpoint 308 may be utilized for load balancing purposes. In some embodiments, proxy endpoint 308 may be located in a network different from one or more nodes.

Console 310 may represent a node including functionality for generating and/or for sending test configuration information to registration server 1202 and/or other nodes, such as proxy endpoint 308 and endpoint 306. In some embodiments, console 310 may include functionality similar to the console functionality described above with regard to console/registration server 204. In some embodiments, console 310 may be used to configure a test session, to receive test results, to process the test results, and/or to display the results to a user. For example, console 310 may indirectly communicate with endpoint 306 via one or more proxy nodes.

It will be appreciated that FIG. 3 is for illustrative purposes and that various nodes, their locations, and/or their functions described above in relation to FIG. 3 may be changed, altered, added, or removed. For example, some nodes and/or functions may be combined into a single entity, e.g., registration server 302 may be integrated with console 310 similar to console/registration server 204.

Figure 4:
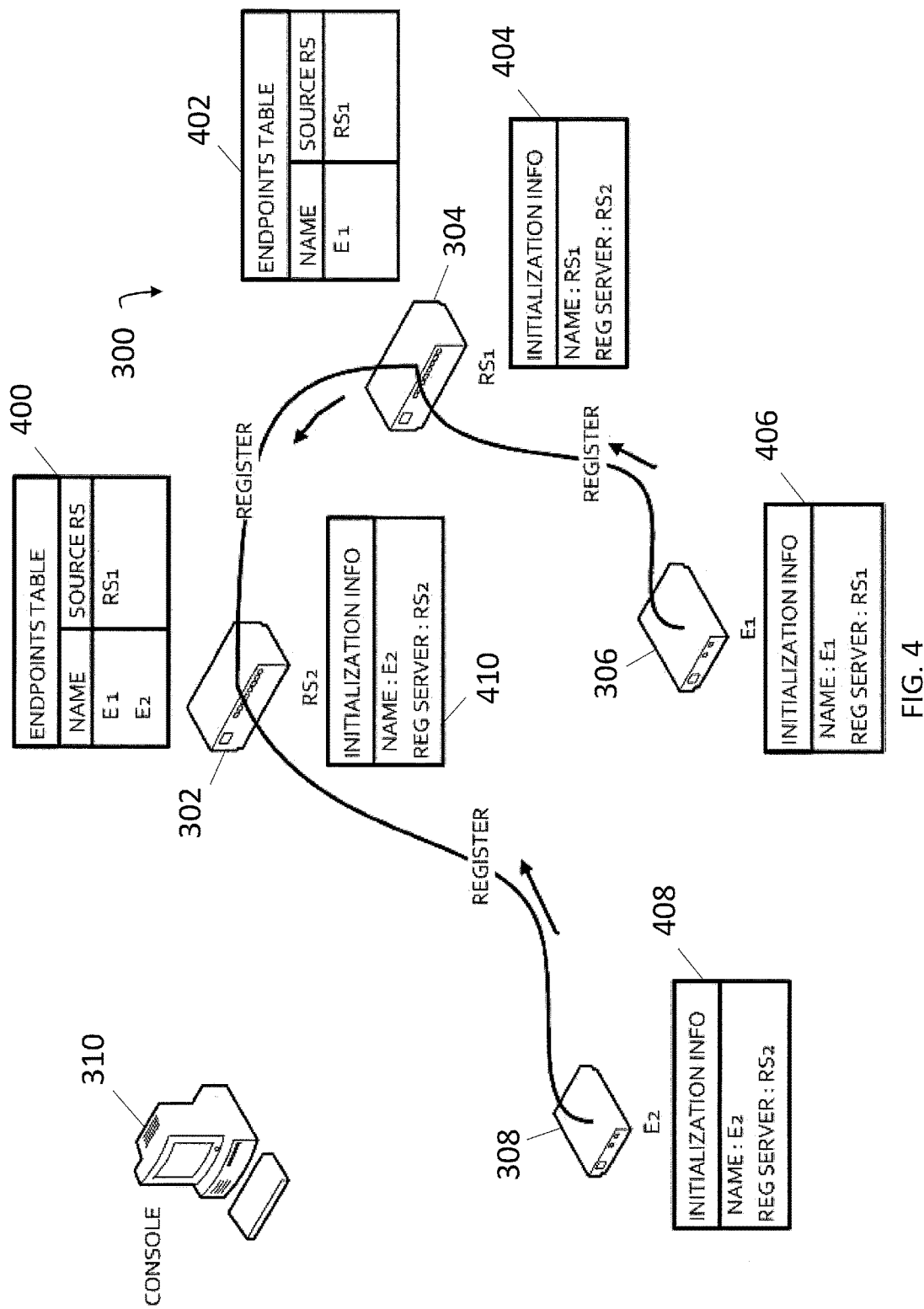
FIG. 4 is a diagram illustrating endpoint registration according to an embodiment of the subject matter described herein.

FIG. 4 is a diagram illustrating endpoint registration in test network 300 according to an embodiment of the subject matter described herein. Referring to FIG. 4, endpoint 306 may send a registration message to registration server 304 for providing node identification information and/or other information (e.g., status and/or state information) about endpoint 306. Proxy registration server 304 may receive the registration message and may store or update a registration data structure 402 based on the information provided. Proxy registration server 304 may also send of forward the registration message and/or information associated with endpoint 306 to registration server 302. Registration server 304 may receive the registration message and/or related information and may store or update a registration data structure 400 based on the information provided. Proxy endpoint 308 may send a registration message to registration server 302 for providing node identification information and/or other information (e.g., status and/or state information) about endpoint 308. Registration server 302 may receive the registration message and may store or update registration data structure 400 based on the information provided.

In some embodiments, after registering with registration server 302 and/or 304, endpoints 306 and/or 308 may periodically or aperiodically send a keep-alive message for indicating that the respective node is currently operable or active. For example, if registration server 302 does not receive a keep-alive message from proxy endpoint 308 within a certain time period (e.g., at least every four seconds), registration server 302 may assume proxy endpoint 308 is inoperable or inactive.

In some embodiments, a registration message may include node identification information. For example, node identification information may include a name, a version identifier, an operating system identifier, a platform identifier, address information, and/or port information. In this example, node identification information may also include initialization information which may be preconfigured and may be usable for indicating where to send registration messages and/or for indicating a particular registration server to use.

Figure 5:
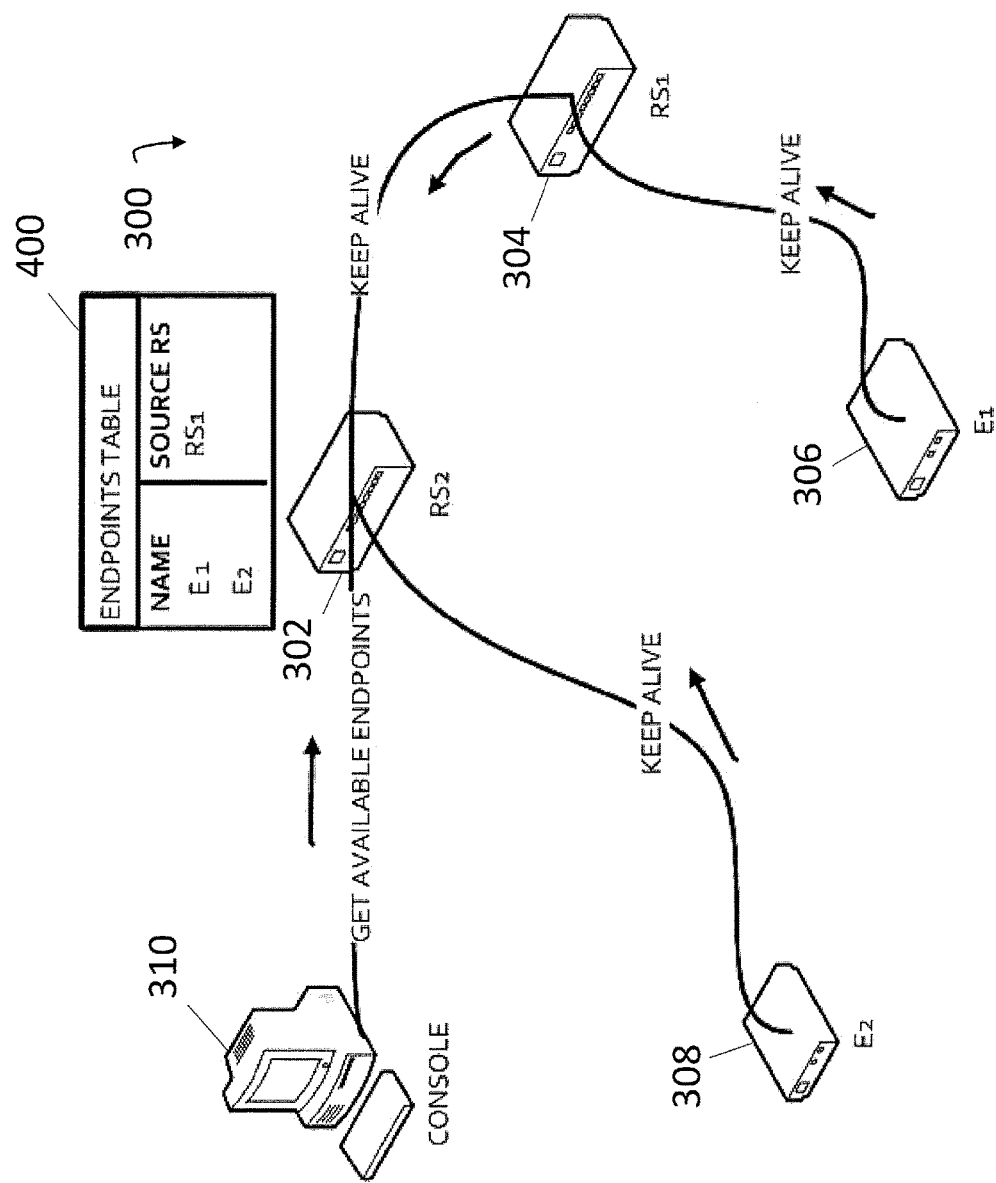
FIG. 5 is a diagram illustrating endpoint information retrieval according to an embodiment of the subject matter described herein.

FIG. 5 is a diagram illustrating endpoint information retrieval in test network 300 according to an embodiment of the subject matter described herein. Referring to FIG. 5, prior to generating test configuration information, console 310 may request node identification information from registration server 302. In some embodiments, in response to receiving a request for node identification information, registration server 302 may obtain node identification information from registration data structure 400 and may send the node identification information in a response message to console.

In some embodiments, console 310 may receive information about available (e.g., registered) endpoints (e.g., endpoints 306 and 308) from registration server 302. In this example, console 310 may use this information for generating a test session and/or for generating test configuration information.

Figure 6:
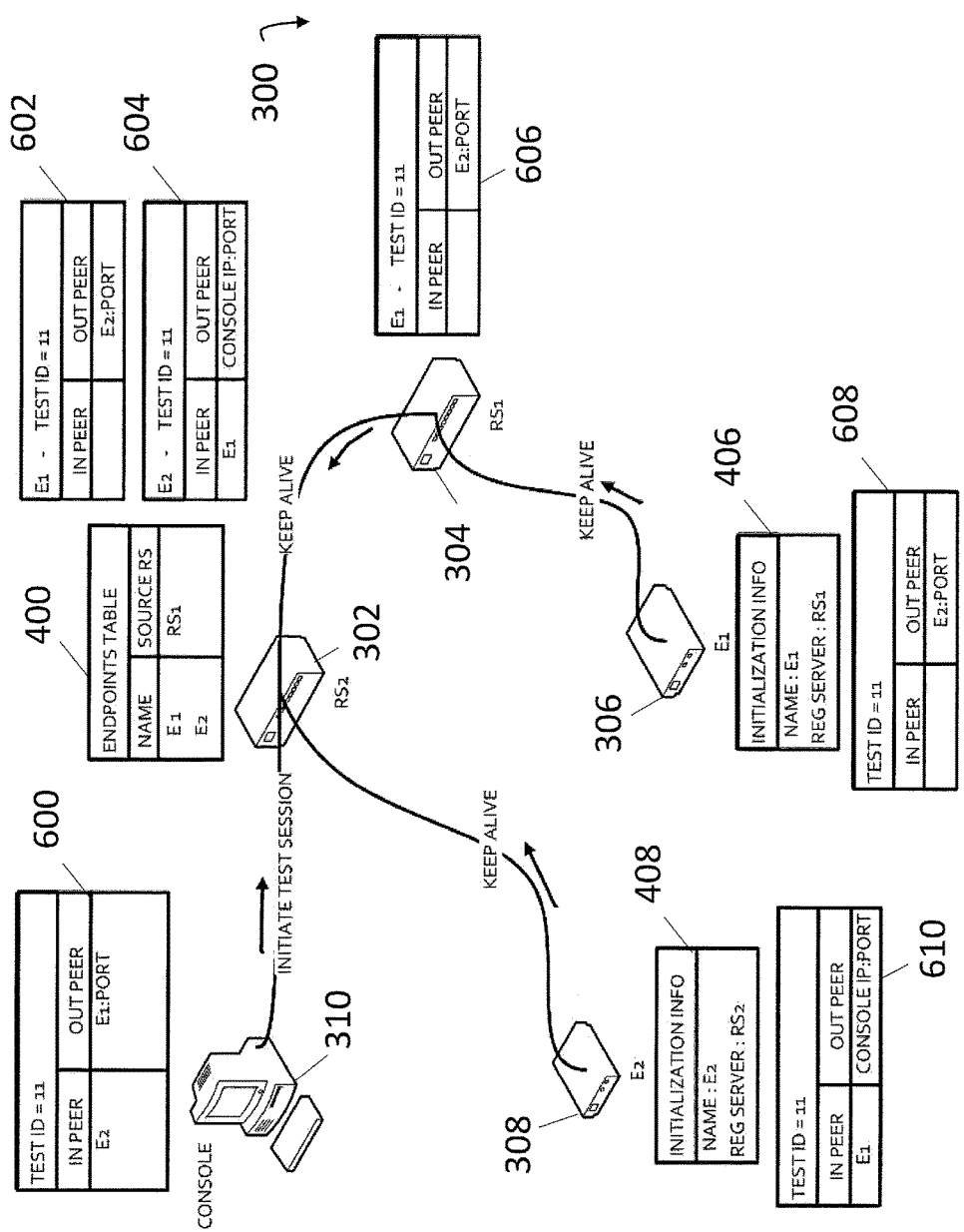
FIG. 6 is a diagram illustrating communication of test configuration information according to an embodiment of the subject matter described herein.

FIG. 6 is a diagram illustrating communication of test configuration information in test network 300 according to an embodiment of the subject matter described herein. Referring to FIG. 6, after generating test configuration information, console 310 (e.g., controlled by user 106) may initiate a test session and/or may initiate propagation and/or communication of test configuration information to registration server 302, proxy registration server 304, endpoint 306, and/or proxy endpoint 308.

In some embodiments, console 310 may send test configuration information, such as test data 600, to registration server 302. In some embodiments, registration server 302 may modify the test configuration information and/or generate additional test configuration information before sending the information to one or more nodes. For example, registration server 302 may receive test configuration information and may create endpoint test data (e.g., endpoint test data 602 or 604) containing test related information for each endpoint that is to receive the test configuration information.

In some embodiments, registration server 302 may send test configuration information (e.g., relevant endpoint test data) to appropriate endpoints and/or intermediate nodes. For example, registration server 302 may respond to a keep-alive message from proxy registration server 304 with a message containing endpoint test data 602. In this example, after receiving endpoint test data 602 and in response to receiving a keep-alive message from endpoint 306, proxy registration server 304 may respond with a message containing endpoint test data 602. In another example, registration server 302 may respond to a keep-alive message from proxy endpoint 308 with a message containing endpoint test data 604.

In some embodiments, test configuration information and/or endpoint test data may include address information and/or port information for communicating with console 310 and/or other peer nodes. For example, test configuration information may include an IP address and a port identifier for communicating with console 310. Test configuration information may also indicate whether a node will initiate a connection or be a recipient of a connection initiation. For example, test configuration information may include a set of inbound peers and/or a set of outbound peers for a particular node.

In some embodiments, an inbound peer may represent a node that sends a connection request to a particular node and an outbound peer may represent a node that receives a connection request from a particular node. For example, a node may initiate a connection with an outbound peer, while an inbound peer may initiate a connection with the node.

In some embodiments, an inbound peer may represent a node from which information is directly or indirectly received and an outbound peer may represent a node from which information is directly or indirectly sent. For example, test data 600 may indicate that, for a test session '11', proxy endpoint 308 acts as an inbound peer for providing test results and/or other information to console 310 and that endpoint 306 acts as an outbound peer for receiving test configuration information and/or other information from console 310.

In some embodiments, e.g., where a node does not wait for a connection to be initiated or where a node does not initiate a connection, an inbound peer or outbound peer may not be stored. For example, test endpoint data 602 may indicate that, for a test session '11', proxy endpoint 308 acts as an outbound peer for endpoint 306 and that endpoint 306 does not include an inbound peer.

Figure 7:
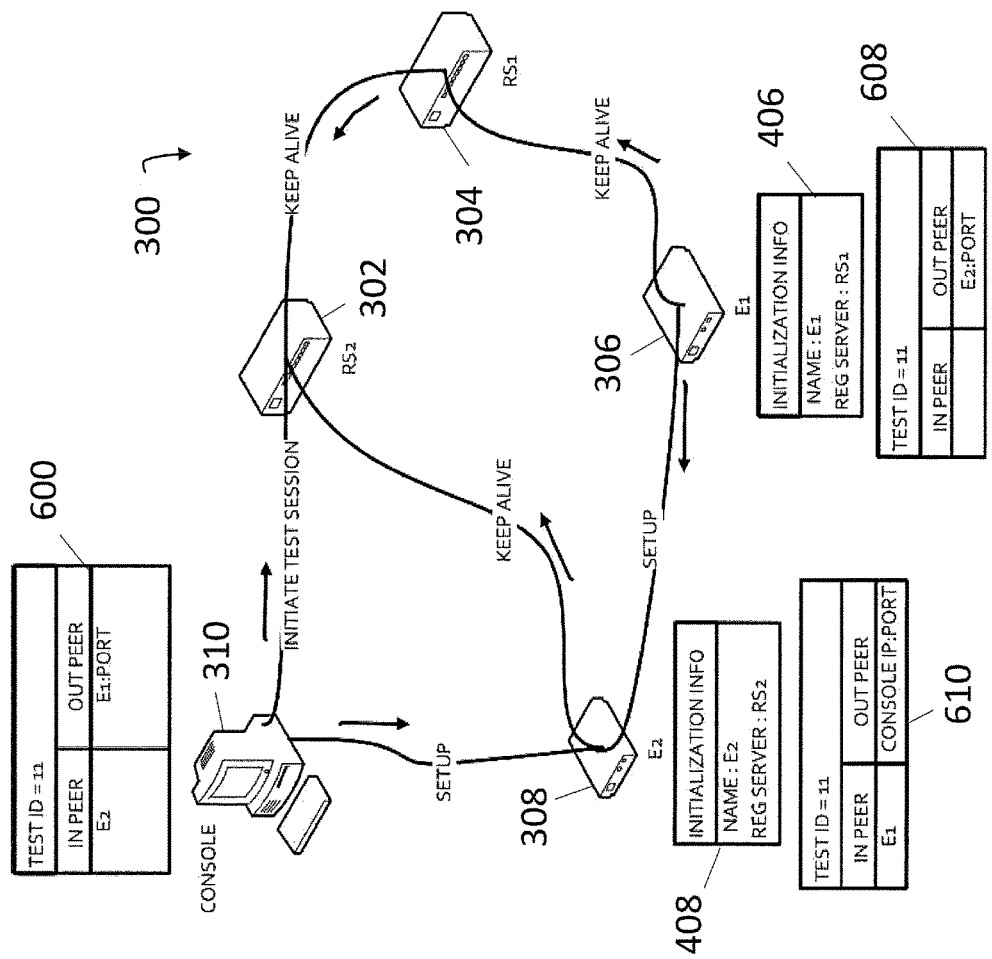
FIG. 7 is a diagram illustrating test setup according to an embodiment of the subject matter described herein.

FIG. 7 is a diagram illustrating test setup in test network 300 according to an embodiment of the subject matter described herein. In some embodiments, after receiving test configuration information, proxy endpoint 308 and/or endpoint 306 may use the test configuration information to request additional test configuration information (e.g., traffic and/or test setup information).

Referring to FIG. 7, endpoint 306 may open (e.g., initiate and establish) a connection with proxy endpoint 308, e.g., using address information received via a registration response message from registration server 302. Proxy endpoint 308 may open a connection with console 310 and may provide node identification information associated with endpoint 306 to console 310. Console 310 may send test setup information associated with endpoint 306 to proxy endpoint 308. After receiving the test setup information, proxy endpoint 308 may send or forward the test setup information to endpoint 306.

In some embodiments, after each endpoint has received adequate test configuration (e.g., test setup information), endpoint 306 may execute a test session and obtained or gathered test results.

Figure 8:
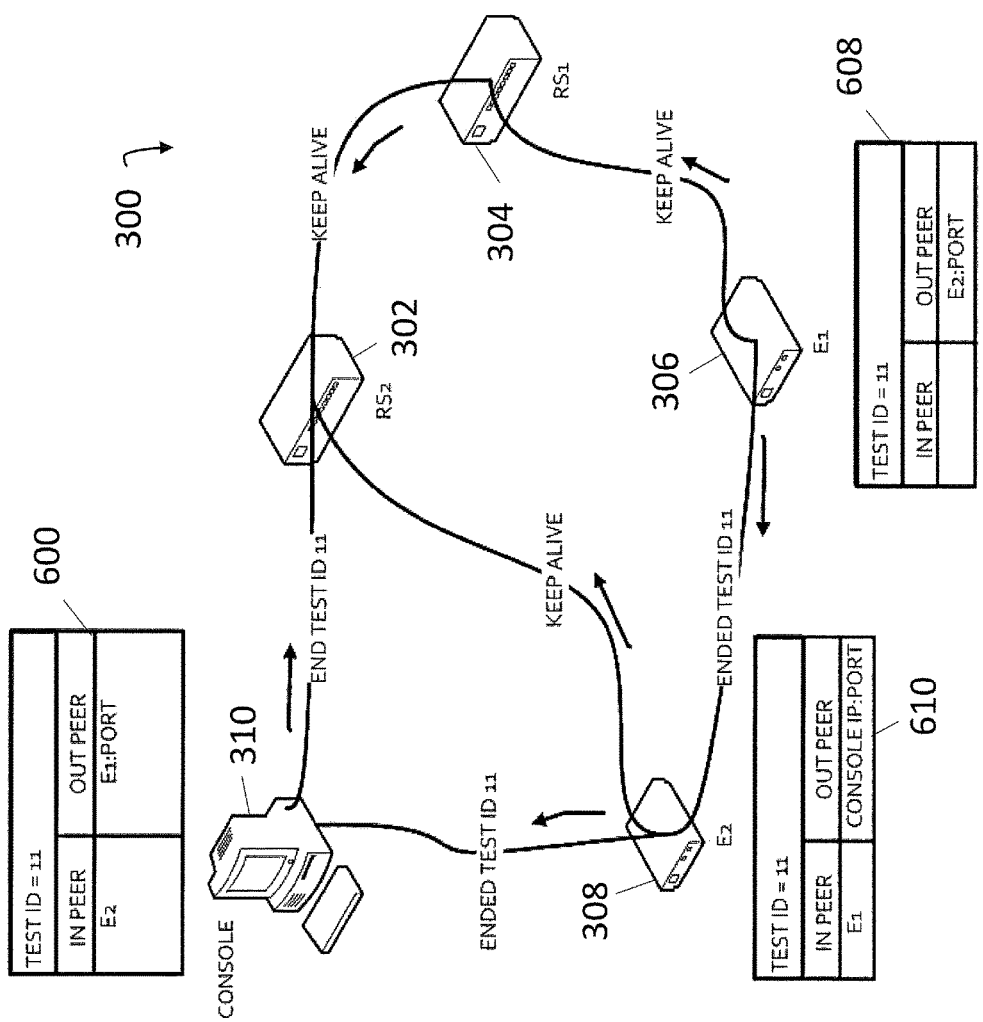
FIG. 8 is a diagram illustrating test completion according to an embodiment of the subject matter described herein.

FIG. 8 is a diagram illustrating test completion in test network 300 according to an embodiment of the subject matter described herein. Referring to FIG. 8, after test results are obtained or gathered, console 310 may send an end test command for stopping or ending a particular test session. For example, console 310 may send an end test command for ending a test session '11' to registration server 302. In this example, registration server 302 may propagate the end test command to endpoint 306 via proxy registration server 304 using keep-alive response messages. In another example, an end test command may be sent to endpoint 306 an end test message via proxy endpoint 308.

In some embodiments, after receiving the end test command, endpoint 306 may stop the test and notify proxy endpoint 308 that the test session has ended and, in response, proxy endpoint 308 may notify console 310 that the test session has ended.

In some embodiments (e.g., the embodiments depicted in FIGS. 7 and 8), registration server 302 and/or registration server 304 may not act as a router for communication from console 310 to endpoints 306 and/or 308 since routing such communications may be inefficient and/or cause significant delays. Instead, in such embodiments, registration server 302 and/or registration server 304 may act as a facilitator by providing information (e.g., address related information) for allowing console 310 and endpoints 306 and 308 to discover and communicate with each other, e.g., for receiving additional test configuration information (e.g., test setup information), for starting a test session, and/or for ending the test session.

Figure 9:
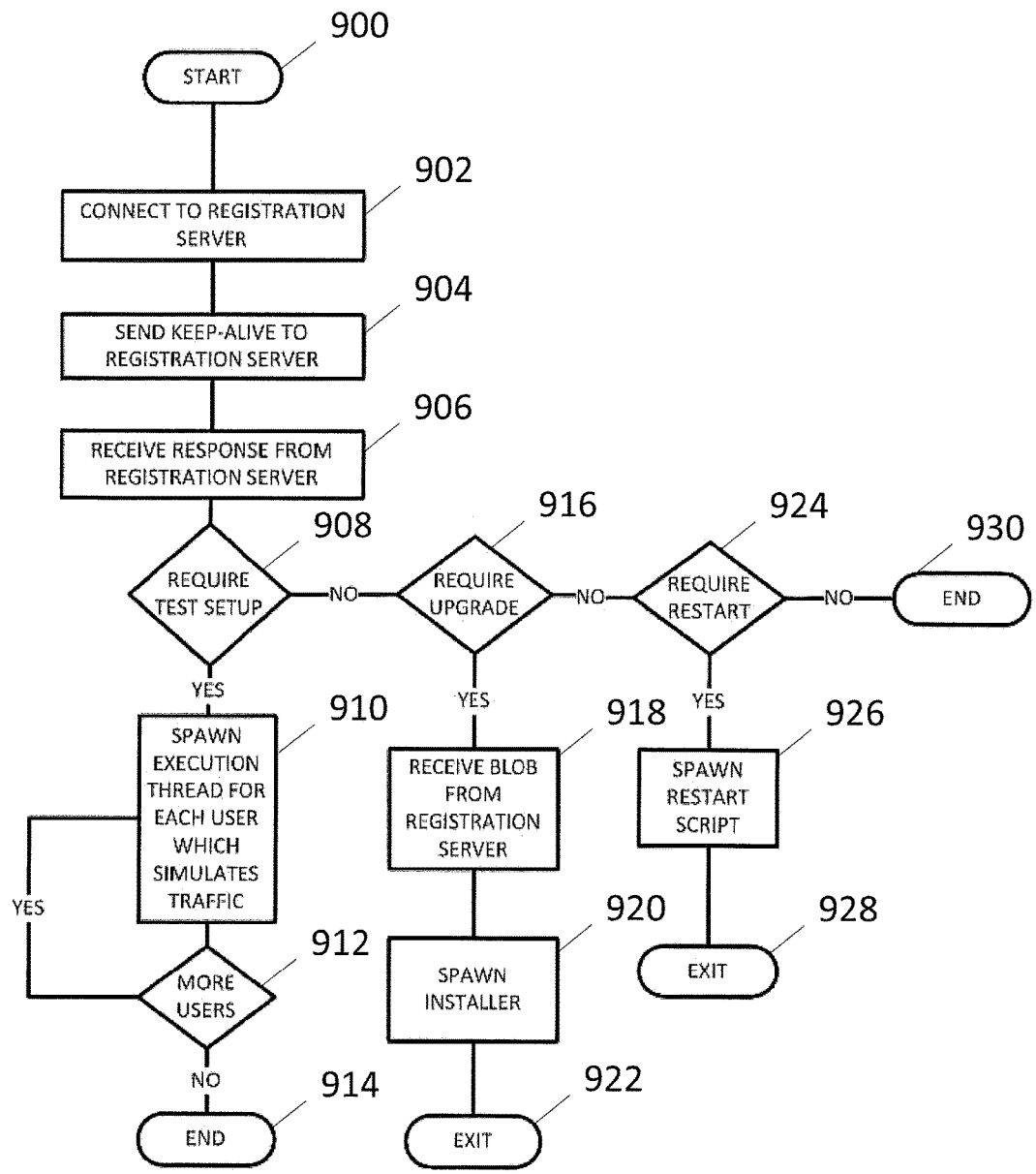
FIG. 9 is a diagram illustrating an exemplary process for processing a keep-alive response message according to an embodiment of the subject matter described herein.

FIG. 9 is a diagram illustrating an exemplary process for processing a keep-alive response message according to an embodiment of the subject matter described herein. In some embodiments, the exemplary process, or portions thereof, may be performed by or at computing platform 100, TCM 102, and/or another node or module. In some embodiments, an exemplary process may include at some of steps 900-930.

Referring to FIG. 9, an exemplary process may begin at step 900. At step 902, an endpoint may connect to and/or register with a registration server.

At step 904, the endpoint may send a keep-alive message to the registration server. For example, endpoint 302 may be configured to send keep-alive messages periodically to registration server 304 and may include status and/or state information.

At step 906, the endpoint may receive a response message from the registration server. For example, registration server 304 may send a response message that indicates when a new test is to start or that a maintenance operation is needed.

At step 908, it may be determined whether test setup and/or test configuration is required. If test setup and/or test configuration information is required, step 910 may occur. If not, step 916 may occur.

At step 910, test setup and/or test configuration may occur including generating or spawning an execution thread for each emulated user or node that generates test traffic. For example, if a test session is started, endpoint 302 may receive test configuration information for spawning one or more threads, where each thread may generate and/or send test traffic for one or more emulated user.

At step 912, it may be determined whether more users or nodes need to be emulated. If so, step 910 may occur until enough users or nodes are emulated via execution threads. If not, step 914 may occur.

At step 914, the exemplary process may end.

At step 916, in response to determining that test setup and/or test configuration is not required, it may be determined whether an upgrade or maintenance is required. If an upgrade or maintenance is required, step 918 may occur. If not, step 924 may occur.

At step 918, information for performing an upgrade or maintenance may be received from the registration server.

At step 920, an installer or other application may be spawned or generated to perform an upgrade or maintenance.

At step 922, the exemplary process may end.

At step 924, it may be determined whether a system restart is required. If a system restart is required, step 926 may occur. If not, step 930 may occur.

At step 926, a restart script or other application may be spawned or generated to perform a system restart.

At step 928, the exemplary process may end.

At step 930, the exemplary process may end.

It will be appreciated that the process depicted in FIG. 9 is for illustrative purposes and that different and/or additional actions may be used. It will also be appreciated that various actions described herein may occur in a different order or sequence.

Figure 10:
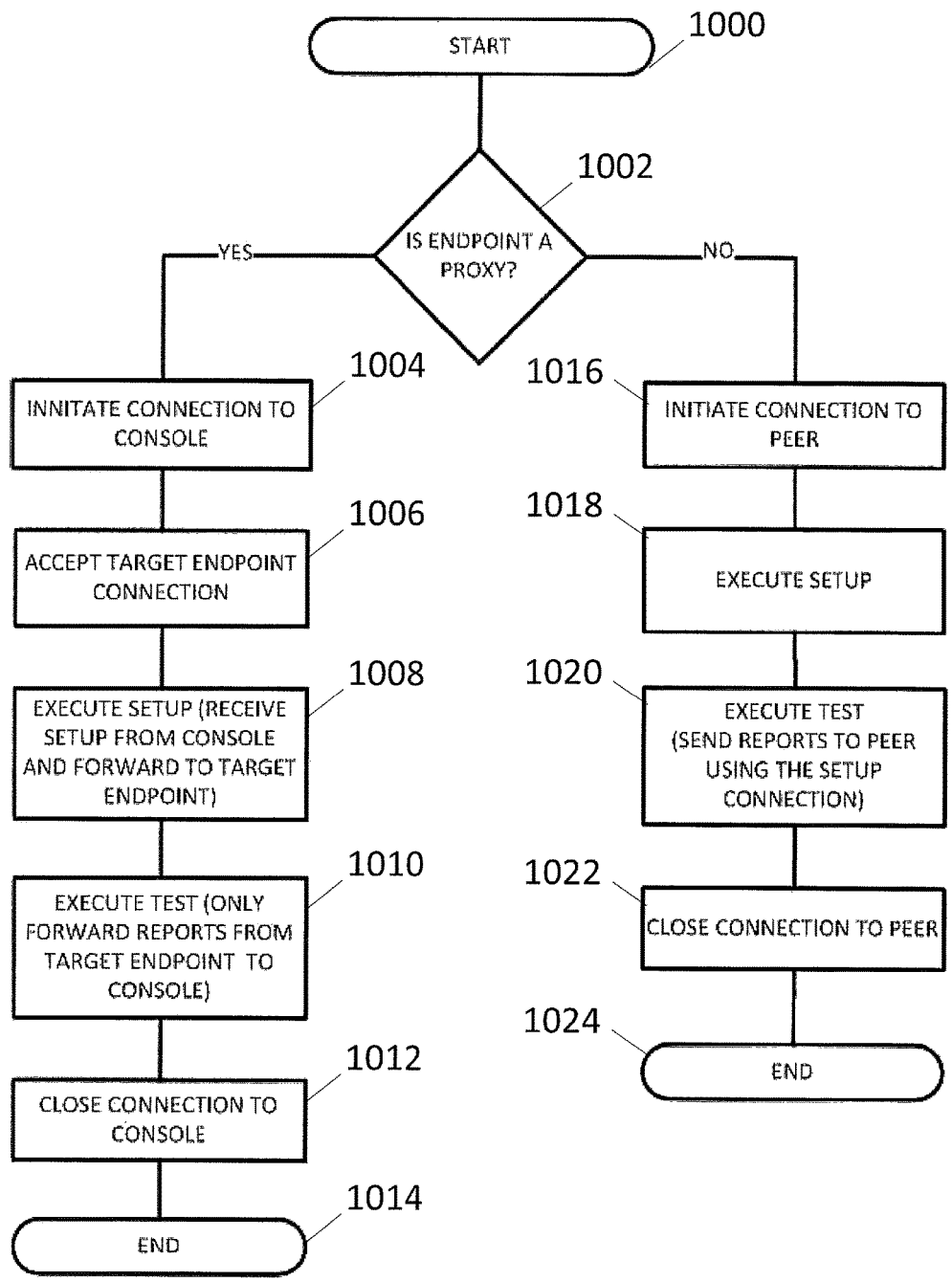
FIG. 10 is a diagram an exemplary process for endpoint connection handling according to an embodiment of the subject matter described herein.

FIG. 10 is a diagram an exemplary process for endpoint connection handling according to an embodiment of the subject matter described herein. In some embodiments, the exemplary process, or portions thereof, may be performed by or at computing platform 100, TCM 102, and/or another node or module. In some embodiments, an exemplary process may include at some of steps 1000-1024.

Referring to FIG. 10, an exemplary process may begin at step 1000. At step 1002, it may be determined whether an endpoint is a proxy endpoint. If the endpoint is a proxy endpoint, step 1004 may occur. If not, step 1016 may occur.

At step 1004, in response to determining that the endpoint is a proxy node, the proxy endpoint may initiate a connection to a console. For example, proxy endpoint 308 may use an IP address and a port identifier received via registration server 302 when initiating a connection with console 310.

At step 1006, the proxy endpoint may wait for a connection to be initiated by a target endpoint and may accept the connection. For example, endpoint 306 may initiate a connection with proxy endpoint 308 and proxy endpoint 308 may accept the connection once initiated.

At step 1008, test configuration information (e.g., test setup information) may be received from the console and may be sent to the target endpoint. For example, proxy endpoint 308 may receive test setup information from console 310 and may forward the test setup information to endpoint 306.

At step 1010, a test session may be executed and the proxy endpoint may send test results and/or related information received from the target endpoint to the console. For example, during and/or after a test session, endpoint 306 may forward test results and/or reports to proxy endpoint 308 and proxy endpoint 308 may send or forward the information to console 310.

At step 1012, the proxy endpoint may close the connection with the console. For example, after testing has ended, proxy endpoint 308 may close the connection with console 310.

At step 1014, the exemplary process may end.

At step 1016, in response to determining that the endpoint is not a proxy endpoint, the endpoint may initiate a connection to a peer, e.g., a proxy endpoint. For example, endpoint 306 may initiate a connection with proxy endpoint 308 for receiving test configuration information (e.g., test setup information) from console 310.

At step 1018, the endpoint may receive test configuration information (e.g., test setup information) from a console. For example, endpoint 306 may initiate a connection with proxy endpoint 308 and proxy endpoint 308 may receive test setup information from console 310 and may forward the test setup information to endpoint 306.

At step 1020, a test session may be executed and the endpoint may send test results and/or related information received to the peer. For example, during and/or after a test session, endpoint 306 may forward test results and/or reports to proxy endpoint 308.

At step 1022, the endpoint may close the connection with the peer. For example, after testing has ended, endpoint 306 may close the connection with proxy endpoint 308.

At step 1024, the exemplary process may end.

It will be appreciated that the process depicted in FIG. 10 is for illustrative purposes and that different and/or additional actions may be used. It will also be appreciated that various actions described herein may occur in a different order or sequence.

Figure 11:
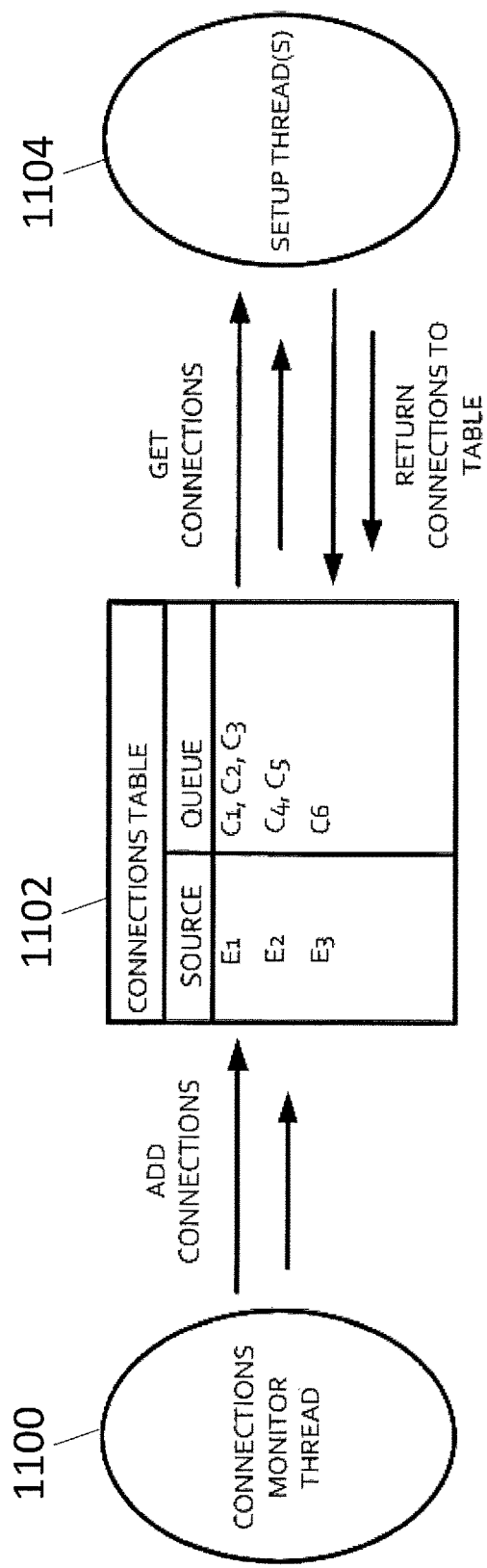
FIG. 11 is a diagram illustrating test connection processing according to an embodiment of the subject matter described herein.

FIG. 11 is a diagram illustrating test connection processing according to an embodiment of the subject matter described herein. In some embodiments, connection requests may include requests for test configuration information (e.g., test setup information) and/or other test related information and may include node identification information for indicating the requester. For example, console 310 may receive connection requests from different endpoints. In this example, the different endpoints may be associated with different test configurations and, as such, console 310 may be configured to provide appropriate (and likely different) test configuration information to each endpoint.

In some embodiments, console 310 may utilize multiple threads or application instances to handle various aspects of connection request processing. For example, one or more threads may be configured to receive connection requests and place the requests in a queue or data structure. In this example, setup threads associated with particular endpoints may be configured to retrieve the connection requests from the data structure and, if appropriate (e.g., a thread is associated with the same endpoint as a given request), process the requests, e.g., by accepting a connection and sending test configuration information.

Referring to FIG. 11, a connections monitor thread 1100 may represent a service, and application, or a process (e.g., software executing on a processor) for receiving connection requests and for storing the requests in a connections data structure 1102. In some embodiments, connections monitor thread 1100 may avoid inspecting and/or processing (e.g., responding to requests) connection requests to avoid bottlenecks and/or related delays. In some embodiments, multiple connections monitor threads 1100 may be utilized for one or more networks, segments, nodes, and/or test operators.

Connections data structure 1102 may represent any suitable data structure for storing and/or queuing connection requests. In some embodiments, connections data structure 1102 may be indexable or searchable using node identification information. For example, each connection request may indicate a related endpoint via an endpoint identifier (e.g., 'E1'). In this example, when a thread, such as one of setup thread(s) 1104, queries or obtains a connection request from connections data structure 1102, the thread may attempt to select a connection associated with a particular endpoint identifier.

Setup thread(s) 1104 represent one or more services, and applications, or a processes (e.g., software executing on a processor) for obtaining connection requests from connections data structure 1102 and for inspecting the connection requests, and/or returning the connection requests or processing the connection requests (e.g., by establishing connections and/or providing test configuration information). In some embodiments, each setup thread 1104 may be associated with a particular endpoint or test session. For example, a first setup thread 1104 may process connection requests associated with an endpoint 'E1' and a second setup thread 1104 may process connection requests associated with an endpoint 'E2'.

In some embodiments, each of setup thread(s) 1104 may query or search for a connection request associated with a particular endpoint. If a connection request associated with a particular endpoint is found, setup thread(s) 1104 may obtain the most relevant request (e.g., the oldest request associated with the relevant endpoint) and process the request, e.g., by accepting the request and/or sending test configuration information via the accepted connection.

In some embodiments, if a connection request associated with a particular endpoint is not found, setup thread(s) 1104 may select or obtain an unassociated connection request, e.g., a request that is not yet identified (e.g., by one of setup thread(s) 1104) as being associated with any endpoint identifier. After obtaining the connection request, setup thread(s) 1104 may identify an endpoint associated with the connection request. If the connection request is associated with the same endpoint as setup thread(s) 1104, setup thread(s) 1104 may continue processing the request.

In some embodiments, if an obtained connection request is not associated with the same endpoint as setup thread(s) 1104, setup thread(s) 1104 may return the connection request to connections data structure 1102, where the returned connection request may be indexed using an identifier indicating the associated endpoint. After replacing the connection request, setup thread(s) 1104 may attempt to obtain and process another connection request.

In some embodiments, a returned connection request with an associated endpoint may be obtained and processing by an appropriate setup thread 1104. For example, setup thread(s) 1104 may query or search connections data structure 1102 for a particular endpoint that is associated with a returned connection request and, after finding the returned connection request is indexed by the endpoint, may process the connection request.

Figure 12:
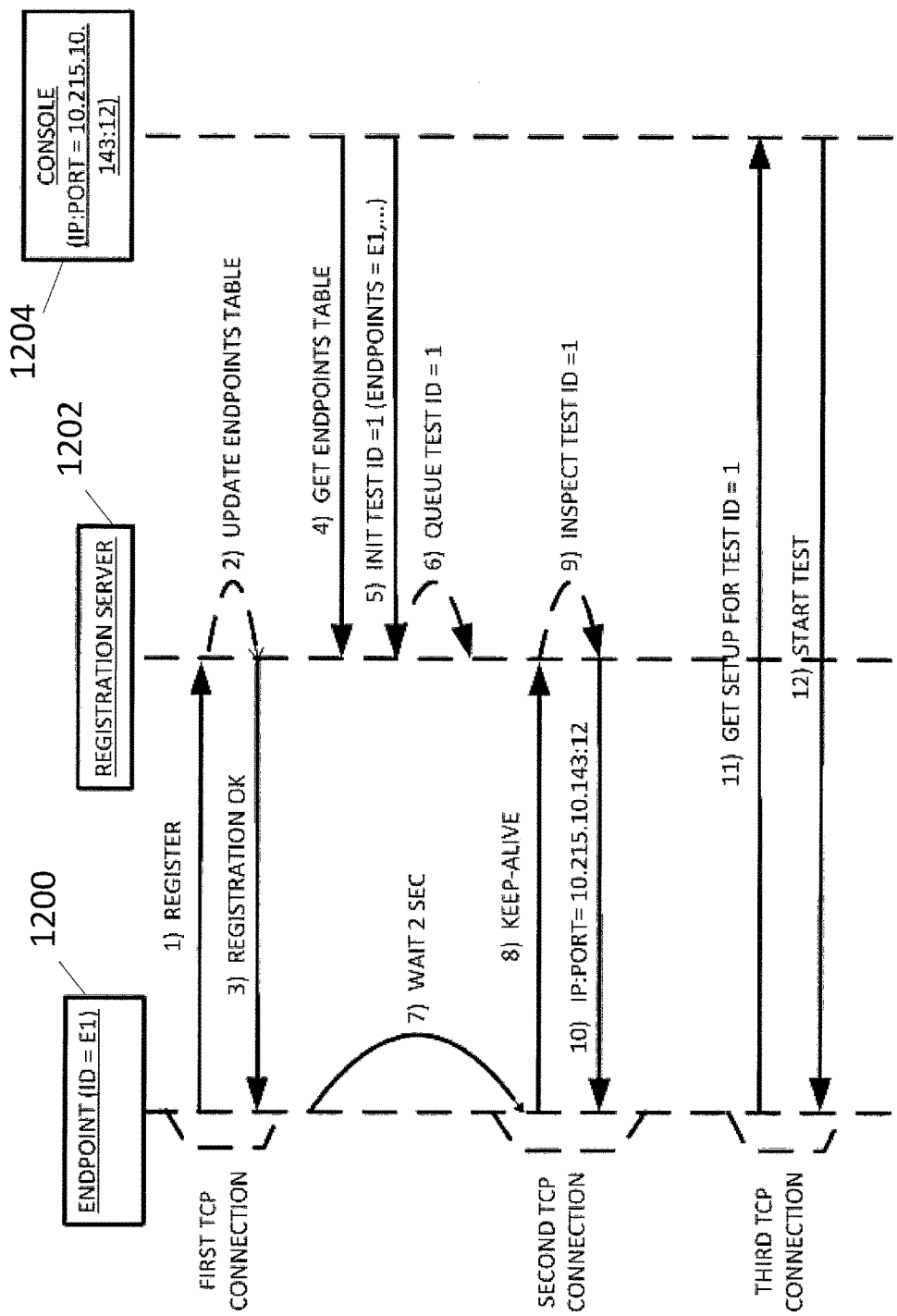
FIG. 12 is a diagram illustrating exemplary communications in a test network according to an embodiment of the subject matter described herein.

FIG. 12 is a diagram illustrating exemplary communications in a test network according to an embodiment of the subject matter described herein. In the embodiment illustrated in FIG. 12, an endpoint 1200, a registration server 1202, and a console 1204 are depicted. Endpoint 1200 may represent a node including TCM 102 and/or similar functionality for receiving test configuration information and for generating test traffic using the test configuration information. In some embodiments, endpoint 1200 may include functionality similar to endpoint 306 and/or proxy endpoint 308.

Registration server 1202 may represent a node capable of communicating with endpoint 1200 and console 1204. In some embodiments, registration server 1202 may receive and store node identification information from endpoint 1200. In some embodiments, registration server 1202 may receive test configuration information from console 1204 and may provide the test configuration information to endpoint 1200. In some embodiments, registration server 1202 may include functionality similar to registration server 302 and/or proxy registration server 304.

Console 1204 may represent a node including functionality for generating and/or for sending test configuration information to registration server 1202. In some embodiments, console 104 may be used to configure a test session, to receive test results, to process the test results, and/or to display the results to a user. In some embodiments, console 1204 may include functionality similar to console 310.

Referring to FIG. 12, at step 1, a registration message may be sent from endpoint 1200 to registration server 1202. In some embodiments, the registration message may include node identification information, such as an IP address and port information.

At step 2, a registration data structure (e.g., registration data structure 400) may be updated to include node identification information from the registration message.

At step 3, a registration OK message for indicating a successful registration may be sent from registration server 1202 to endpoint 1200. In some At step 4, a query request may sent from console 1204 to registration server 1202 for requesting node identification information associated with available endpoints for testing purposes.

At step 5, after generating test configuration information using the node identification information, test configuration information for a test session '1' may be sent from console 1204 to registration server 1204.

At step 6, test configuration information for test session '1' may be stored and/or queued for propagating to relevant nodes.

At step 7, endpoint 1200 may be configured to wait for two seconds before sending a keep-alive message to registration server 1202.

At step 8, a keep-alive message include node identification information may be sent from endpoint 1200 to registration server 1202.

At step 9, registration server 1202 may inspect node identification information associated with the keep-alive message to determine whether any relevant test configuration information should be propagated to endpoint 1200.

At step 10, test configuration information for test session '1' may be sent from registration server 1202 to endpoint 1200. In some embodiments, test configuration information may include address information and/or port information for communicating with console 1204 and/or an intermediate node.

At step 11, a request is sent from endpoint 1200 to console 1204 for setting up a connection and/or for receiving test setup information for test session '1'.

At step 12, test setup information may be sent from console 1204 to endpoint 1200 for setting up and/or starting test session '1'.

It will be appreciated that the communications depicted in FIG. 12 is for illustrative purposes and that different and/or additional actions may be used. It will also be appreciated that various actions described herein may occur in a different order or sequence.

Figure 13:
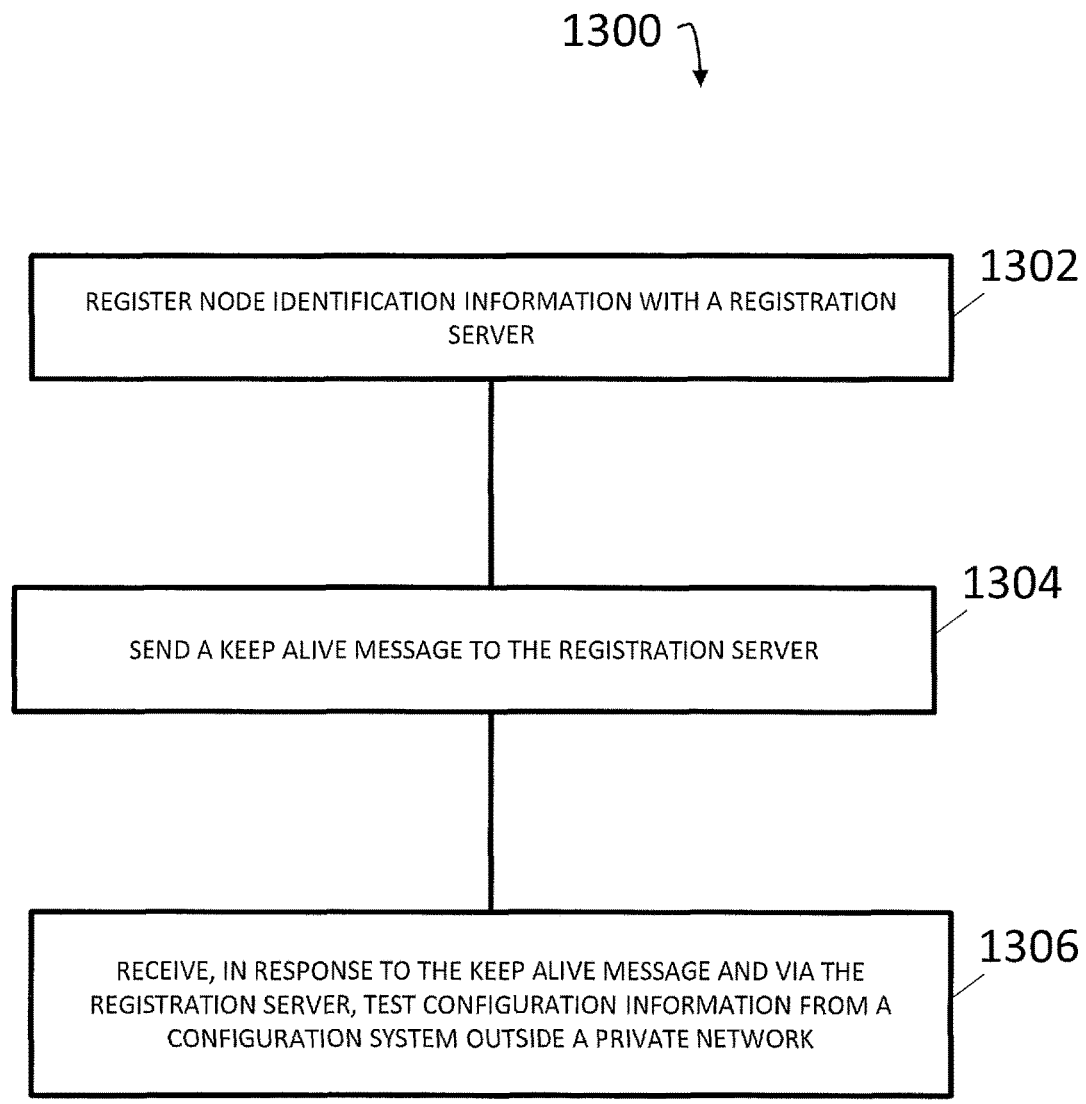
FIG. 13 is a diagram illustrating an exemplary process for receiving test configuration information according to an embodiment of the subject matter described herein.

FIG. 13 is a diagram illustrating an exemplary process 1300 for receiving test configuration information according to an embodiment of the subject matter described herein. In some embodiments, the exemplary process, or portions thereof, may be performed by or at computing platform 100, TCM 102, and/or another node or module. In some embodiments, exemplary process 1300 may include steps 1302, 1304, and/or 1306.

Referring to process 1300, at step 1302, node identification information may be registered with a registration server. For example, endpoint 1200 may send a registration request containing node identification information to registration server 1202. In this example, registration server 1202 may receive the registration request, store the node identification information in a data structure, and send a registration response message indicating that endpoint 1200 is registered.

At step 1304, a keep-alive message may be sent to the registration server. For example, after registering at registration server 1202, endpoint 1200 may send a keep-alive message periodically to registration server 1202.

At step 1306, in response to the keep-alive message and via the registration server, test configuration information may be received from a configuration system outside the private network. For example, console 1204 may generate and send test configuration information to registration server 1202 for communicating the test configuration information to endpoint 1200. In this example, in response to receiving a keep-alive message from endpoint 1200, registration server 1202 may send the test configuration information (e.g., address information associated with the configuration system) in a response message to endpoint 1200.

In some embodiments, prior to an endpoint (e.g., endpoint 1200) receiving the test configuration information from a configuration system (e.g., console 1204) outside the private network, the configuration system may be configured to request node identification information from the registration server, to generate, using the node identification information, the test configuration information and to send the test configuration information to the registration server.

In some embodiments, after receiving test configuration information from a configuration system outside a private network, the test configuration information may be sent to one or more nodes in the private network. For example, in response to receiving, via registration server 302, test configuration information from console 310, registration server 304 may send the test configuration information to endpoint 306.

In some embodiments, after receiving test configuration information from a configuration system outside a private network, a node may be configured to initiate, using the test configuration information, a connection with the configuration system or an intermediate node associated with the configuration system to receive additional test configuration information. For example, endpoint 306 may communicate with proxy endpoint 308 using an IP address and port number provided by registration server 304 and proxy endpoint 308 may communicate with console 310 to receive test setup information and may provide this information to endpoint 306.

In some embodiments, after receiving test configuration information from a configuration system outside a private network, a node may be configured for testing using the test configuration information. For example, in response to receiving, via registration server 302, test configuration information from console 310, endpoint 308 may be configured for testing using the test configuration information.

In some embodiments, a configuration system (e.g., console 310 or console 1204) may be configured to receive, from the node, a connection request containing the node identification information, to store, by a monitoring thread, the connection request in a data structure, to select, by a setup thread, the connection request from the data structure; to inspect, by the setup thread, the node identification information associated with the connection request, to determine, by the setup thread and using the node identification information, whether the setup thread should process the connection request, and in response to determining that the setup thread should process the connection request, to process, by the setup thread, the connection request.

In some embodiments, in response to determining that a setup thread should not process a connection request, the connection request may be stored in a data structure with the node identification information as a key, wherein a different thread selects the connection request using the key.

In some embodiments, a node that receives test configuration information may be behind a firewall that blocks direct communications sent from a configuration system. For example, while registration server 1202 may be able to communicate directly with endpoint 1200 (e.g., by traversing a firewall device), direct communications sent from console 1204 addressed to endpoint 1200 may be blocked or discarded (e.g., by a firewall device).

In some embodiments, node identification information may include a name, a version identifier, an operating system identifier, a platform identifier, address information, and/or port information.

In some embodiments, a node that receives test configuration information may include an endpoint, a proxy endpoint, a proxy registration server, a registration server, and/or a proxy node.

In some embodiments, test configuration information may include information about a test session, node identification information, address information associated with a configuration system, port information associated with the configuration system, information about one or more inbound peers for one or more nodes associated with the test session, and/or information about one or more outbound peers for one or more nodes associated with the test session.

It will be appreciated that exemplary process 1300 is for illustrative purposes and that different and/or additional actions may be used. It will also be appreciated that various actions described herein may occur in a different order or sequence.

It should be noted that computing platform 100, TCM 102, and/or functionality described herein may constitute a special purpose computing device. Further, computing platform 100, TCM 102, and/or functionality described herein can improve the technological field of testing network nodes by providing mechanisms for providing and/or receiving test configuration information in a private network, e.g., using a registration server.

The subject matter described herein for receiving test configuration information improves the functionality of test platforms and/or test tools by providing mechanisms for communicating test configuration information to nodes in a private network (e.g., nodes behind a firewall device and/or NAT device) without requiring additional ports to be opened or address translation. It should also be noted that a computing platform that implements subject matter described herein may comprise a special purpose computing device (e.g., a traffic generator) usable to receive test configuration information.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for receiving test configuration information using a registration server, the method comprising:
   at a node configured to execute a test in a private network and to operate in the private network:
      registering node identification information with a registration server,
      sending a keep-alive message to the registration server; and
      receiving, in response to the keep-alive message and via the registration server, test configuration information for configuring the test from a configuration system outside the private network, wherein the node is behind a firewall that blocks direct communications sent from the configuration system and wherein the test configuration information is sent to the node without opening a port for an inbound connection from the configuration system; wherein prior to the node receiving the test configuration information from the configuration system outside the private network, the configuration system is configured to request node identification information from the registration server; to generate, using the node identification information, the test configuration information; and to send the test configuration information to the registration server.

2. The method of claim 1 comprising:
sending the test configuration information to one or more nodes in the private network.

3. The method of claim 1 comprising:
initiating, using the test configuration information, a connection with the configuration system or an intermediate node associated with the configuration system to receive additional test configuration information.

4. The method of claim 1 comprising:
configuring, using the test configuration information, the node for testing.

5. The method of claim 3 wherein initiating the connection with the configuration system includes:
   at the configuration system:
      receiving, from the node, a connection request containing the node identification information;
      storing, by a monitoring thread, the connection request in a data structure;
      selecting, by a setup thread, the connection request from the data structure;
      inspecting, by the setup thread, the node identification information associated with the connection request;
      determining, by the setup thread and using the node identification information, whether the setup thread should process the connection request; and
      in response to determining that the setup thread should process the connection request, processing, by the setup thread, the connection request.

6. The method of claim 5 comprising:
in response to determining that the setup thread should not process the connection request, storing the connection request in the data structure with the node identification information as a key, wherein a different thread selects the connection request using the key.

7. The method of claim 1 wherein the node identification information includes a name, a version identifier, an operating system identifier, a platform identifier, address information, or port information.

8. The method of claim 1 wherein the node includes an endpoint, a proxy endpoint, a proxy registration server, a registration server, or a proxy node.

9. The method of claim 1 wherein the test configuration information includes information about a test session, the node identification information, address information associated with the configuration system, port information associated with the configuration system, information about one or more inbound peers for one or more nodes associated with the test session, or information about one or more outbound peers for one or more nodes associated with the test session.

10. A system for receiving test configuration information, the system comprising:
   a node configured to execute a test in a private network and to operate in the private network, the node comprising:
      a test configuration module (TCM) configured to:
         register node identification information with a registration server,
         send a keep-alive message to the registration server; and
         receive, in response to the keep-alive message and via the registration server, test configuration information for configuring the test from a configuration system outside the private network, wherein the node is behind a firewall that blocks direct communications sent from the configuration system and wherein the test configuration information is sent to the node without opening a port for an inbound connection from the configuration system, wherein prior to the node receiving the test configuration information from the configuration system outside the private network, the configuration system is configured to request node identification information from the registration server; to generate, using the node identification information, the test configuration information; and to send the test configuration information to the registration server.

11. The system of claim 10 wherein the node is configured to send the test configuration information to one or more nodes in the private network.

12. The system of claim 10 wherein the node is configured to initiate, using the test configuration information, a connection with the configuration system or an intermediate node associated with the configuration system to receive additional test configuration information.

13. The system of claim 10 wherein the node is configured to configure, using the test configuration information, the node for testing.

14. The system of claim 12 wherein the configuration system is configured to:
receive, from the node, a connection request containing the node identification information;
store, by a monitoring thread, the connection request in a data structure;
select, by a setup thread, the connection request from the data structure;
inspect, by the setup thread, the node identification information associated with the connection request;
determine, by the setup thread and using the node identification information, whether the setup thread should process the connection request; and
in response to determining that the setup thread should process the connection request, process, by the setup thread, the connection request.

15. The system of claim 14 wherein the configuration system is configured to:
in response to determining that the setup thread should not process the connection request, store the connection request in the data structure with the node identification information as a key, wherein a different thread selects the connection request using the key.

16. The system of claim 10 wherein the node identification information includes a name, a version identifier, an operating system identifier, a platform identifier, address information, or port information.

17. The system of claim 10 wherein the node includes an endpoint, a proxy endpoint, a proxy registration server, a registration server, or a proxy node.

18. The system of claim 10 wherein the test configuration information includes information about a test session, the node identification information, address information associated with the configuration system, port information associated with the configuration system, information about one or more inbound peers for one or more nodes associated with the test session, or information about one or more outbound peers for one or more nodes associated with the test session.

19. A non-transitory computer readable medium comprising computer executable instructions embodied in the non-transitory computer readable medium that when executed by a processor of a computer perform steps comprising:
at a node configured to execute a test in a private network and to operate in the private network:
registering node identification information with a registration server,
sending a keep-alive message to the registration server; and
receiving, in response to the keep-alive message and via the registration server, test configuration information for configuring the test from a configuration system outside the private network, wherein the node is behind a firewall that blocks direct communications sent from the configuration system and wherein the test configuration information is sent to the node without opening a port for an inbound connection from the configuration system, wherein prior to the node receiving the test configuration information from the configuration system outside the private network, the configuration system is configured to request node identification information from the registration server; to generate, using the node identification information, the test configuration information; and to send the test configuration information to the registration server.

\* \* \* \* \*